US012709388B2

(12) United States Patent
Baladi et al.

(10) Patent No.: US 12,709,388 B2
(45) Date of Patent: Aug. 18, 2026

(54) HYBRID ELECTRIC AIRCRAFT WITH GYROSCOPIC STABILIZATION CONTROL

(71) Applicants: General Electric Company, Schenectady, NY (US); GE Avio S.r.l., Rivalta di Torino (IT)

(72) Inventors: Mehdi Milani Baladi, Turin (IT); Randy M. Vondrell, Cincinnati, OH (US)

(73) Assignees: General Electric Company, Evendale, OH (US); GE Avio S.r.l., Rivalta di Torino (IT)

( * ) Notice: Subject to any disclaimer, the term of this patent is extended or adjusted under 35 U.S.C. 154(b) by 186 days.

(21) Appl. No.: 18/439,870

(22) Filed: Feb. 13, 2024

(65) Prior Publication Data

US 2025/0026470 A1 Jan. 23, 2025

Related U.S. Application Data

(62) Division of application No. 17/529,556, filed on Nov. 18, 2021, now Pat. No. 11,945,573.

(30) Foreign Application Priority Data

Jul. 9, 2021 (IT) ........................ 102021000018170

(51) Int. Cl.
*B64C 29/00* (2006.01)
*B64C 17/06* (2006.01)
(Continued)

(52) U.S. Cl.
CPC .......... *B64C 29/0033* (2013.01); *B64C 17/06* (2013.01); *B64D 27/14* (2013.01);
(Continued)

(58) Field of Classification Search
CPC ..... B64C 29/0033; B64C 17/06; B64C 17/10; B64D 27/14; B64D 27/32; B64D 27/33; Y02T 50/60
See application file for complete search history.

(56) References Cited

U.S. PATENT DOCUMENTS 3,460,783 A * 8/1969 Haberkorn .......... B64C 29/0075 244/56
7,857,254 B2 12/2010 Parks
(Continued)

FOREIGN PATENT DOCUMENTS

CN 111348197 A 6/2020
RU 2419576 C2 5/2011
(Continued)

*Primary Examiner* — Kito R Robinson
*Assistant Examiner* — Alexander V Gentile
(74) *Attorney, Agent, or Firm* — Dority & Manning, P.A.

(57) ABSTRACT

A hybrid electric aircraft equipped with gyroscopic stabilization control is provided. In one aspect, a hybrid electric aircraft includes a turbo-generator having a gas turbine engine and an electric generator operatively coupled thereto for generating electrical power. The turbo-generator defines a rotation axis. The aircraft also includes one or more electrically-driven propulsors for producing thrust for the aircraft. In addition, the aircraft includes a pivot mount operatively coupled with the turbo-generator. To provide gyroscopic stabilization control of the aircraft, the pivot mount is controlled to adjust the rotation axis of the turbo-generator relative to a prime stability axis of the aircraft. Additionally or alternatively, a rotational speed of the turbo-generator can be changed to provide gyroscopic stabilization control of the aircraft.

20 Claims, 7 Drawing Sheets

(51) Int. Cl.

| | |
|---|---|
| ***B64D 27/14*** | (2006.01) |
| ***B64D 27/32*** | (2024.01) |
| ***B64D 27/33*** | (2024.01) |
| *B64C 17/10* | (2006.01) |

(52) U.S. Cl.

CPC ............. *B64D 27/32* (2024.01); *B64D 27/33* (2024.01); *B64C 17/10* (2013.01)

(56) References Cited

U.S. PATENT DOCUMENTS

| | | | |
|---|---|---|---|
| 9,702,254 B2 | 7/2017 | Saiz | |
| 10,351,235 B2 | 7/2019 | Karem et al. | |
| 10,710,713 B2 | 7/2020 | Mia | |
| 2004/0026563 A1 | 2/2004 | Moller | |
| 2007/0057113 A1* | 3/2007 | Parks | B64C 29/0041 244/12.5 |
| 2013/0026303 A1 | 1/2013 | Wang | |
| 2017/0203839 A1* | 7/2017 | Giannini | B64C 39/12 |
| 2018/0290742 A1 | 10/2018 | Oldroyd et al. | |
| 2019/0256200 A1 | 8/2019 | Neff | |
| 2019/0291859 A1 | 9/2019 | Manning | |
| 2019/0375495 A1 | 12/2019 | Pfammatter et al. | |
| 2020/0148374 A1* | 5/2020 | Kawai | B64U 10/13 |
| 2020/0301446 A1 | 9/2020 | Leong | |
| 2021/0179259 A1* | 6/2021 | Ho | B64C 13/16 |

FOREIGN PATENT DOCUMENTS

| | | |
|---|---|---|
| RU | 2542805 C1 | 2/2015 |
| WO | WO2007108794 A1 | 9/2007 |
| WO | WO2014/175849 A1 | 10/2014 |
| WO | WO2019/190263 A1 | 10/2019 |

* cited by examiner 119
120
132
118
130
222
180
160
L1
122
112
124
170
100
126
116
PSA
114
V
L2

HYBRID ELECTRIC AIRCRAFT WITH GYROSCOPIC STABILIZATION CONTROL

PRIORITY INFORMATION

The present application is a divisional application of U.S. patent application Ser. No. 17/529,556 filed Nov. 18, 2021, which claims priority to Italian Patent Application Number 102021000018170 filed on Jul. 9, 2021, each of which is incorporated by reference in their entirety.

FIELD

The present subject matter relates generally to hybrid electric aircraft and methods of operating the same.

BACKGROUND

Some fixed-wing Vertical Take-Off and Landing (VTOL) aircraft include rotating propulsion units that allow such aircraft to transition between vertical and horizontal flight. One challenge with such aircraft is keeping the aircraft stable during thrust vector transitions (i.e., transitioning from vertical to horizontal flight or vice versa), banking turns, as well as some other dynamic maneuvers. During such maneuvers, the thrust axis of the aircraft may not align with a prime stability axis of the aircraft and torque of precession. This can cause destabilizing yaw and roll moments on the aircraft, such as Dutch rolls, divergent spirals, and other out-of-phase flight dynamic modes. Accordingly, if the prime stability axis is not kept sufficiently stable, a catastrophic event may result.

Conventionally, legacy fixed-wing VTOL aircraft have included relatively large control surfaces, such as large rudder and tails, to keep the prime stability axis of the aircraft stable during such maneuvers. While generally sufficient to maintain the stability of the prime stability axis of aircraft, such large control surfaces can cause significant drag on the aircraft, which is undesirable. More recently, fixed-wing hybrid electric VTOL (or eVTOL) aircraft are being developed for growing needs, such as passenger and goods transport. However, stabilization of the prime stability axis for such aircraft during dynamic maneuvers and transitions has still presented certain challenges.

Thus, a hybrid electric aircraft, and more particularly a fixed-wing VTOL hybrid electric aircraft, equipped with gyroscopic stabilization control and methods of operating the same would be useful additions to the art.

BRIEF DESCRIPTION

Aspects and advantages of the invention will be set forth in part in the following description, or may be obvious from the description, or may be learned through practice of the invention.

In one aspect, an aircraft is provided. The aircraft defines a prime stability axis. The aircraft includes a turbo-generator having a gas turbine engine and an electric generator operatively coupled with the gas turbine engine. The turbo-generator defines a rotation axis about which a spool of the gas turbine engine is rotatable. Further, the aircraft includes one or more propulsors. Each of the one or more propulsors are electrically-driven. In addition, the aircraft includes a pivot mount operatively coupled with the turbo-generator. The pivot mount is operable to adjust the rotation axis of the turbo-generator relative to the prime stability axis of the aircraft.

In another aspect, a method of gyroscopic stabilization of an aircraft is provided. The method includes causing, based at least in part on an orientation of a rotation axis of a turbo-generator of the aircraft relative to an orientation of a prime stability axis of the aircraft, at least one of: i) adjustment of the rotation axis relative to the prime stability axis of the aircraft; and ii) adjustment of a rotational speed of the turbo-generator.

In yet another aspect, a non-transitory computer readable medium is provided. The non-transitory computer readable medium comprises computer-executable instructions, which, when executed by one or more processors of a computing system of an aircraft, cause the one or more processors to: cause, based at least in part on an orientation of a rotation axis of a turbo-generator of the aircraft relative to an orientation of a prime stability axis of the aircraft, at least one of: i) adjustment of the rotation axis relative to the prime stability axis of the aircraft; and ii) adjustment of a rotational speed of the turbo-generator.

These and other features, aspects and advantages of the present subject matter will become better understood with reference to the following description and appended claims. The accompanying drawings, which are incorporated in and constitute a part of this specification, illustrate embodiments of the subject matter and, together with the description, explain the principles of the subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
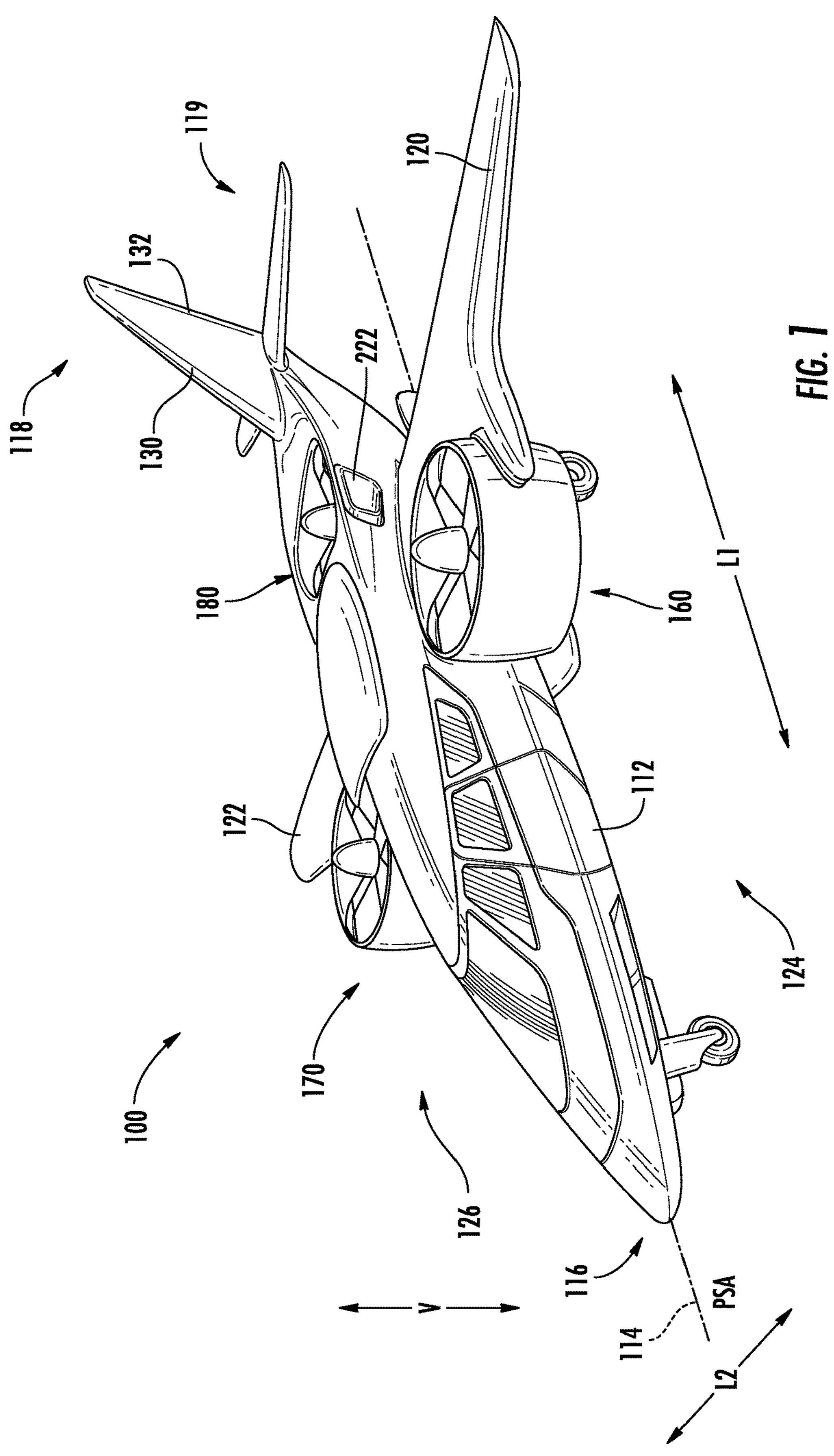
FIG. 1 provides a perspective view of an aircraft according to one example embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent (10%) margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to a hybrid electric aircraft equipped with gyroscopic stabilization control. In one example aspect, an aircraft includes a hybrid-electric propulsion system having a turbo-generator and one or more electrically-driven propulsors. The turbo-generator includes a gas turbine engine and an electric generator operatively coupled to the gas turbine engine. The electric generator generates electrical power when driven by the gas turbine engine. The turbo-generator defines a rotation axis. One or more spools of the gas turbine engine and the electric generator may rotate about the rotation axis.

Notably, the hybrid electric architecture of the aircraft provides the capability of divorcing the rotation axis and rotational speed of the turbo-generator from the thrust axis or thrust vector of the propulsors. That is, the rotation axis and rotational speed of the turbo-generator can be decoupled from the thrust axis. In this regard, the rotation axis of the turbo-generator is independent of a thrust orientation of at least one of the one or more propulsors. Likewise, the rotational speed of the turbo-generator is also independent of the rotational speed of at least one of the one or more propulsors. Divorcing these two axes allows for the turbo-generator to be used as a gyroscopic stabilizer as the turbo-generator has a spinning mass with inertia and angular momentum. Accordingly, as will be provided in detail herein, the turbo-generator can be used to apply a force to stabilize or destabilize the aircraft, e.g., during thrust vector transitions, aggressive maneuvers, etc.

Particularly, the aircraft can include one or more pivot mounts operable to adjust the turbo-generator so that a center of the rotation axis of the turbo-generator is moved relative to a prime stability axis defined by the aircraft. For instance, during a thrust vector transition (i.e., transitioning from vertical to horizontal flight or vice versa) or some other maneuver, the pivot mounts can be controlled to move the turbo-generator so that the center of the rotation axis is aligned with or closer to alignment with the prime stability axis of the aircraft. The pivot mounts can be controlled to translate and/or rotate the turbo-generator so that the center of the rotation axis is changed relative to the prime stability axis of the aircraft. By aligning the rotation axis and the prime stability axis, the turbo-generator applies inertial forces on the fuselage and inside the aircraft thereby countering the destabilizing forces caused by torque of precession. This, in effect, stabilizes the aircraft. The gyroscopic stabilization effect provided by the rotation of the realigned turbo-generator allows for wider variety of aircraft geometries, control surfaces, and propulsion mounting locations and also enables safe thrust vector transitions and aggressive maneuvers while reducing the risk for out-of-phase coupling of pitch role instability modes. These capabilities and additional degrees of freedom in stabilizing the aircraft may also be leveraged to reduce the size and drag of conventional control surfaces, such as rudder and tail size, which may further enhance aircraft aerodynamics.

Moreover, in addition or alternatively to adjusting the orientation of the turbo-generator, the rotational speed of the turbo-generator may be adjusted as well to provide stability to the aircraft. Decoupling the angular momentum and rotational speed of the turbo-generator from the thrust generation demands enables manipulation of the relative angular momentum of the turbo-generator to "loosen" or "stiffen" the prime stability axis of the aircraft depending on the phase of flight and needs of the pilot.

Accordingly, to summarize, the hybrid electric architecture of the aircraft provides the ability to divorce or decouple the speed, power produced, and rotation axis of the turbo-generator from the thrust needs and thrust axis of the aircraft. The independence of the speed, power produced, and rotation axis of the turbo-generator from the thrust needs and thrust axis allows for the turbo-generator to be used to stabilize the aircraft. As noted, pivot mounts can be controlled to adjust the rotation axis of the turbo-generator relative to the prime stability axis of the aircraft to stabilize the aircraft. In this regard, the gyroscopic stabilizing effect of the turbo-generator can be leveraged for stabilization control. Means to adjust the rotation axis or axis of gyration of the turbo-generator may be active or passive. Additionally or alternatively, the rotational speed of the turbo-generator can be used to stabilize the aircraft. For instance, the rotational speed can be changed to "loosen" or "stiffen" the prime stability axis of the aircraft. During such rotational speed changes, battery banks can supplement or fully provide the electrical power needed by the electrically-driven propulsors and/or can receive excess electrical power not currently needed by the loads of the aircraft. Methods of operating a hybrid electric aircraft equipped with gyroscopic stabilization control will also be provided.

Figure 2:
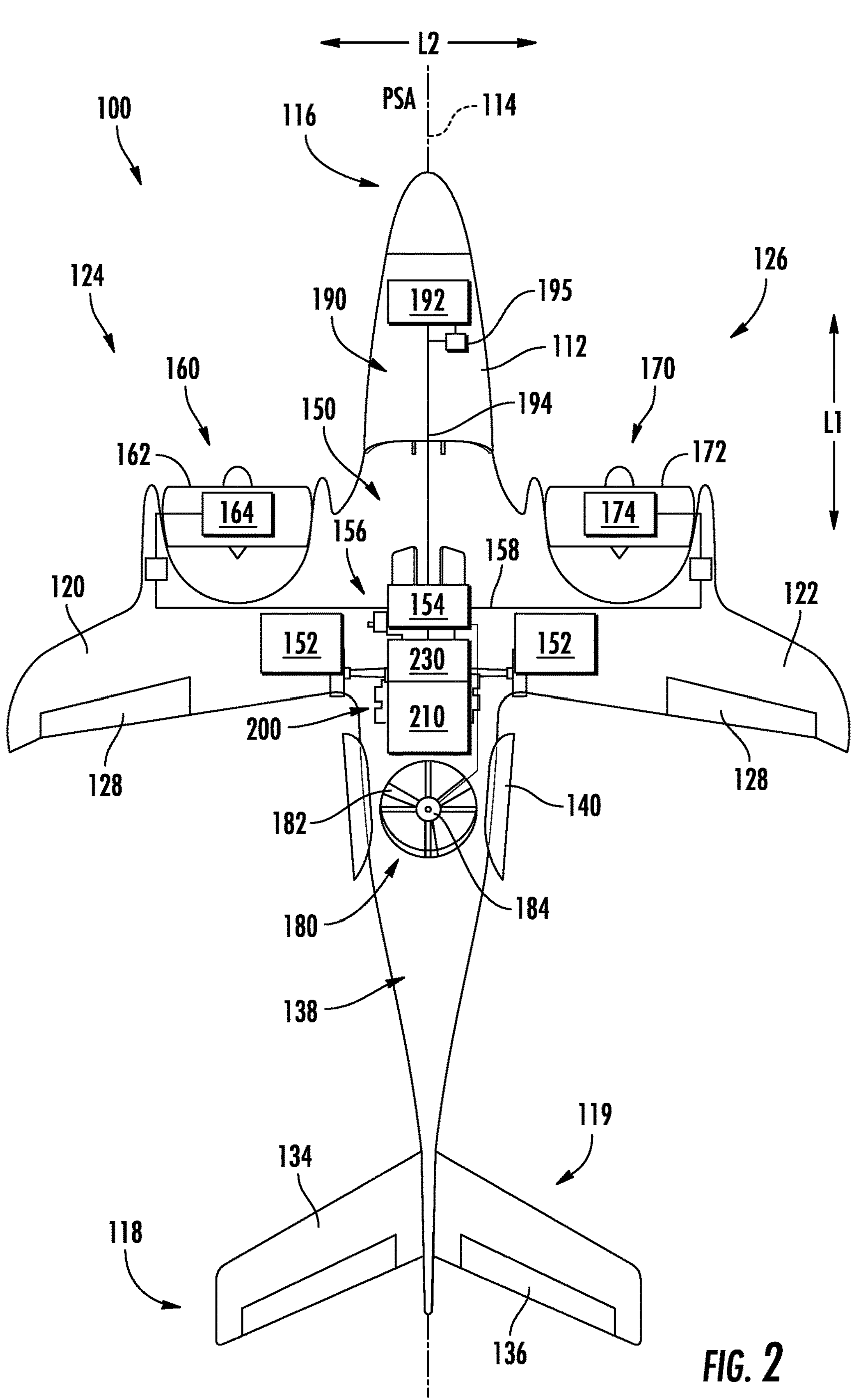
FIG. 2 provides a schematic top view of the aircraft of FIG. 1.

With reference now to FIGS. 1 and 2, FIG. 1 provides a perspective view of an aircraft 100 as may incorporate various embodiments of the present disclosure. FIG. 2 provides a schematic top view of the aircraft 100. For this embodiment, the aircraft 100 is a fixed-wing hybrid electric Vertical Takeoff and Landing (VTOL) aircraft. For reference, the aircraft 100 defines a longitudinal direction L1, a lateral direction L2, and a vertical direction V. The aircraft 100 also defines a longitudinal centerline 114 that extends therethrough along the longitudinal direction L1.

As shown, the aircraft 100 extends between a forward end 116 and an aft end 118, e.g., along the longitudinal direction L1. Moreover, the aircraft 100 includes a fuselage 112 that extends longitudinally from the forward end 116 of the aircraft 100 to the aft end 118 of the aircraft 100. The aircraft 100 also includes an empennage 119 at the aft end 118 of the aircraft 100. In addition, the aircraft 100 includes a wing assembly including a first, port side wing 120 and a second, starboard side wing 122. The first and second wings 120, 122 each extend laterally outward with respect to the longitudinal centerline 114. The second wing extends outward from the fuselage 112 in a direction opposite the first wing 120. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100. In addition, the aircraft 100 defines a prime stability axis PSA. Although the prime stability axis PSA is shown extending along or coaxial with the longitudinal centerline 114 in FIGS. 1 and 2, it will be appreciated that the prime stability axis PSA may not be coaxial with the longitudinal centerline 114, especially during aggressive flight maneuvers and thrust orientation transitions.

The aircraft 100 includes various control surfaces. For this embodiment, each wing 120, 122 includes one or more trailing edge flaps 128. The aircraft 100 further includes, or more specifically, the empennage 119 of the aircraft 100 includes, a vertical stabilizer 130 having a rudder flap 132 for yaw control and a pair of horizontal stabilizers 134 each having an elevator flap 136 for pitch control. The fuselage 112 additionally includes an outer surface or skin 138. It should be appreciated that in other exemplary embodiments, the aircraft 100 may additionally or alternatively include any other suitable configuration. For example, in other embodiments, the aircraft 100 may include any other control surface configuration.

Further, the exemplary aircraft 100 of FIGS. 1 and 2 includes a hybrid-electric propulsion system 150. For this embodiment, the hybrid-electric propulsion system 150 includes a turbo-generator 200. The turbo-generator 200 includes a gas turbine engine 210 and an electric generator 230 operatively coupled with the gas turbine engine 210. The electric generator 230 can be operatively coupled with a spool of the gas turbine engine 210, can be coupled with the gas turbine engine 210 via a gearbox, or in some other suitable manner. The electric generator 230 is operable to convert mechanical power output by the gas turbine engine 210 into electrical power. The generated electrical power can be provided to various electrical loads as will be explained further below.

The hybrid-electric propulsion system 150 also includes propulsors for producing thrust. Particularly, for this embodiment, the hybrid-electric propulsion system 150 includes a first propulsor 160 mounted to the first wing 120, a second propulsor 170 mounted to the second wing 122, and a third propulsor 180 mounted aft of the wings 120, 122 to the fuselage 112. Each propulsor 160, 170, 180, has a fan and an electric motor. As shown, the first propulsor 160 includes a fan 162 and an electric motor 164 for driving the fan 162. The fan 162 includes a plurality of rotatable fan blades and a casing circumferentially surrounding the fan blades. In this regard, the fan 162 is a ducted fan. In other embodiments, however, the fan 162 can be unducted. The second propulsor 170 is similarly configured as the first propulsor 160. As shown, the second propulsor 170 includes a fan 172 and an electric motor 174 for driving the fan 172. The third propulsor 180 also includes a fan 182 and an electric motor 184 for driving the fan 182. The fan 182 is ducted by the structure of the fuselage 112.

Notably, the first and second propulsors 160, 170 are pivotable or movable between various thrust orientations. In this regard, the first and second propulsors 160, 170 are pivotably mounted to their respective wings 120, 122. The thrust orientation of the first and second propulsors 160, 170 can be changed so that the aircraft 100 can be maneuvered in vertical flight, horizontal flight, or a combination thereof. The first and second propulsors 160, 170 can be transitioned or moved between their respective thrust orientations by any suitable means, such as by one or more mechanical, electric, hydraulic, electrohydraulic, or pneumatic actuators.

For this embodiment, the first and second propulsors 160, 170 are both movable to at least a first thrust orientation and a second thrust orientation. For example, when oriented in the first thrust orientation, the first and second propulsors 160, 170 can produce vertical thrust. For instance, when the first and second propulsors 160, 170 are oriented in the first thrust orientation as shown in FIG. 1, the first and second propulsors 160, 170 are oriented so that their respective thrust vectors are oriented vertically, thus allowing for vertical flight. The third propulsor 180 is also oriented so that its thrust vector is oriented vertically. In this way, the third propulsor 180 can produce vertical thrust along with the first and second propulsors 160, 170 during vertical flight or as needed to produce more lift. In contrast, when oriented in the second thrust orientation, the first and second propulsors 160, 170 can produce horizontal thrust. For instance, when the first and second propulsors 160, 170 are oriented in the second thrust orientation as shown in FIG. 2, the first and second propulsors 160, 170 are oriented so that their respective thrust vectors are oriented horizontally, thus allowing for horizontal flight. During horizontal flight, the third propulsor 180 need not be actively rotated as lift is generated primarily by the wings 120, 122. A door 140 can be moved closed during horizontal flight to reduce drag on the aircraft 100. In FIGS. 1 and 2, the door 140 is shown in the open position.

The hybrid-electric propulsion system 150 further includes one or more electric energy storage units 152 electrically connectable to various electrical components of the aircraft 100, including the electric generator 230 and the electric motors 164, 174, 184. The electric energy storage units 152 may be configured as one or more batteries, such as one or more lithium-ion batteries, or alternatively may be configured as any other suitable electrical energy storage devices, such as supercapacitors. For the hybrid-electric propulsion system 150 described herein, the electric energy storage units 152 are configured to store a relatively large amount of electrical power. For example, in certain exemplary embodiments, the electric energy storage units 152 may be configured to store at least about fifty kilowatt hours of electrical power, such as at least about sixty-five kilowatt hours of electrical power, such as at least about seventy-five kilowatts hours of electrical power, and up to about one thousand kilowatt hours of electrical power.

The hybrid-electric propulsion system 150 also includes a power management system having a controller 154 and a power bus 156. The electric motors 164, 174, 184, the electric energy storage units 152, and the controller 154 are each electrically connectable to one another through one or more electric lines 158 of the power bus 156. For instance, the power bus 156 may include various switches or other power electronics movable to selectively electrically connect the various components of the hybrid-electric propulsion system 150. Additionally, the power bus 156 may further include power electronics, such as inverters, converters, rectifiers, etc., for conditioning or converting electrical power within the hybrid-electric propulsion system 150.

The controller 154 is configured to distribute electrical power between the various components of the hybrid-electric propulsion system 150. For example, the controller 154 may control the power electronics of the power bus 156 to provide electrical power to various components, such as the electric motors 164, 174, 184, to operate the hybrid-electric propulsion system 150 and ultimately produce thrust for the aircraft 100. Such is depicted schematically as the electric lines 158 of the power bus 156 extend through the controller 154.

The controller 154 can form a part of a computing system 190 of the aircraft 100. The computing system 190 of the aircraft 100 can include one or more processors and one or more memory devices embodied in one or more computing devices. For instance, as depicted in FIG. 2, the computing system 190 includes controller 154 as well as other computing devices, such as computing device 192. The computing system 190 can include other computing devices as well, such as a controller 196 (FIG. 3) associated with the gas turbine engine 210. The computing devices of the computing system 190 can be communicatively coupled with one another via a communication network 194. For instance, computing device 192 is located in the cockpit of the aircraft 100 and is communicatively coupled with the controller 154 of the hybrid-electric propulsion system 150 via the communication network 194, which can include one or more wired or wireless communication links.

Controller 154, computing device 192, controller 196, and other computing devices of the computing system 190 of the aircraft 100 may be configured in substantially the same manner as the exemplary computing devices of the computing system 500 described below with reference to FIG. 10 (and may be configured to perform one or more of the functions of the exemplary method (400) described below).

The aircraft 100 also includes a plurality of sensors for sensing various operating conditions associated with the aircraft 100. The sensors can be communicatively coupled with the computing device 192 as well as other computing devices of the computing system 190. For instance, the aircraft 100 can include an Inertial Measurement Unit (IMU) 195. Generally, the IMU 195 is operable to sense an orientation of the aircraft 100. The sensed orientation of the aircraft 100 can be provided to the computing device 192 and/or to other computing devices of the computing system 190 of the aircraft 100. Knowing the orientation of the aircraft 100 as well as other information associated with the aircraft 100, such as the aircraft center of mass, the configuration of the aircraft, the current weight of the aircraft, the thrust orientation of the propulsors 160, 170, the demanded thrust, ambient conditions, etc., one or more processors of the computing system 190 can calculate the prime stability axis PSA of the aircraft 100. The IMU 195 can include one or more accelerometers, one or more gyroscopes, and in some embodiments, one or more magnetometers. In addition, as will be appreciated, the aircraft 100 can include other sensors as well, such as airspeed sensors, temperature sensors, pressure sensors, altitude sensors, weight sensors, sensors for recording ambient conditions, and the like. Sensor data can be provided to the one or more processors of the computing system 190.

Figure 3:
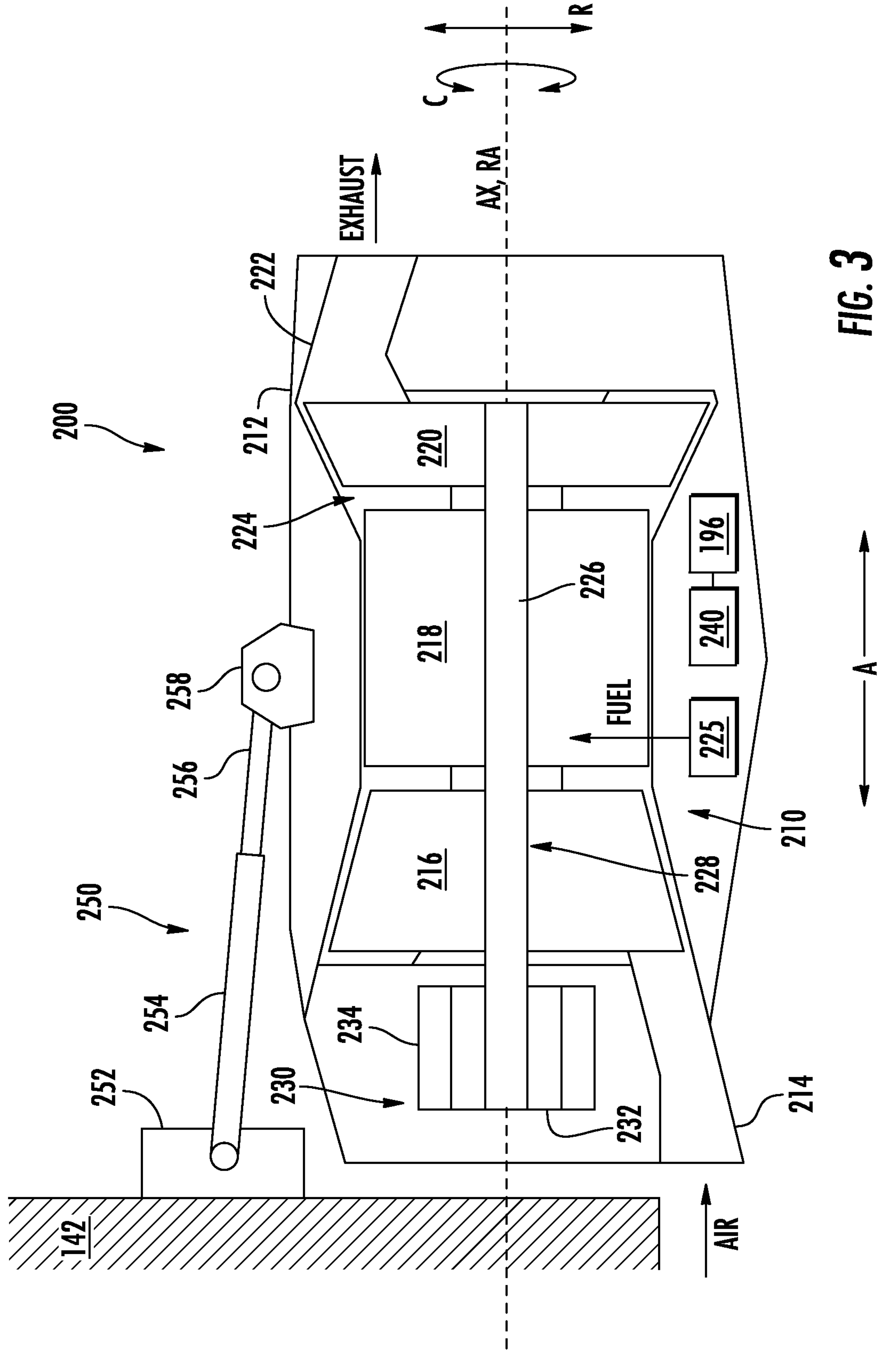
FIG. 3 provides a schematic view of a turbo-generator of the aircraft of FIGS. 1 and 2.

FIG. 3 provides a schematic view of the turbo-generator 200 of the aircraft 100 of FIGS. 1 and 2. As noted, the turbo-generator 200 includes gas turbine engine 210 and electric generator 230 operatively coupled thereto. The turbo-generator 200 can be mounted within the aircraft 100 (as shown best in FIG. 2). For reference, the turbo-generator 200 defines an axial direction A, a radial direction R, a longitudinal or axial centerline AX extending therethrough along the axial direction A, and a circumferential direction C extending three hundred sixty degrees around the axial centerline AX. Moreover, for this embodiment, the turbo-generator 200 defines a rotation axis RA, which for this embodiment is coaxial with the axial centerline AX.

As shown in FIG. 3, the gas turbine engine 210 includes a substantially tubular cowl 212. An inlet port 214 is connected to the cowl 212 and permits an incoming flow of air to flow into the core of the gas turbine engine 210. The cowl 212 encases, in serial flow relationship, a compressor section that includes a compressor 216; a combustion section including a combustor 218; and a turbine section including a turbine 220. An exhaust port 222 is connected to the cowl 212 and permits exhaust to exit the core of the gas turbine engine 210. One of the outlets of the exhaust port 222 can be seen in FIG. 1. The compressor section, combustion section, and turbine section together define at least in part a core flowpath 224. The compressor 216 can be a multi-stage, axial-flow compressor that increases the pressure of the air flowing along the core flowpath 224. The compressor 216 can include a number of stages of compressor stator vanes and corresponding rotatable blades. The turbine 220 can include one or more stages of turbine stator vanes and corresponding rotatable blades as well. As depicted in FIG. 3, a fuel system 225 can provide fuel to the combustor 218 so that the compressed air flowing downstream of the compressor 216 may be ignited to generate combustion gases. The fuel system 225 can include fuel tanks for storing the fuel, fuel lines, valves, fuel injectors, as well as other components.

The gas turbine engine 210 also includes a shaft 226 that drivingly connects the compressor 216 and the turbine 220. Particularly, the rotatable blades of the compressor 216 and the rotatable blades of the turbine 220 are coupled with and are rotatable with the shaft 226. The blades of the turbine 220 are rotated by the hot combustion gases flowing therethrough. This extraction of energy causes the shaft 226 and blades of the compressor 216 to rotate. The shaft 226 and blades of the compressor 216 and turbine 220 coupled to the shaft 226 collectively form a spool 228 of the gas turbine engine 210. The spool 228 is rotatable about the rotation axis RA, which is coaxial with the axial centerline AX in this example embodiment, as noted above. In other embodiments, however, rotation axis RA of the spool 228 can be offset from the axial centerline AX, e.g., along the radial direction R.

The gas turbine engine 210 further includes a controller 196. The controller 196 may be an Electronic Engine Controller (EEC) that is a component of a Full Authority Digital Engine Control (FADEC) system, for example. The controller 196 may be configured to control operation of various components of the gas turbine engine 210, such as components of a fuel delivery system that selectively provide fuel to the combustor 218. Additionally, referring back also to FIG. 2, the controller 196 can be communicatively coupled with the controller 154 as well as other components of the computing system 190 via the communication network 194, e.g., via a suitable wired or wireless connection. Moreover, as will be appreciated, the controller 196 may further be communicatively coupled with one or more components of hybrid-electric propulsion system 150 via the communication network.

The turbo-generator 200 also includes a plurality of sensors for sensing various operating conditions associated with the gas turbine engine 210 and/or the electric generator 230. The sensors can be communicatively coupled with the controller 196. In some embodiments, optionally, the gas turbine engine 210 can include an IMU 240. Generally, the IMU 240 is operable to sense an orientation of the turbo-generator 200. The sensed orientation of the turbo-generator 200 can be provided to the controller 196, and consequently, to the computing system 190 of the aircraft 100 (FIGS. 1 and 2). The IMU 240 can include one or more accelerometers, one or more gyroscopes, and in some embodiments, one or more magnetometers. In other embodiments, the orientation of the turbo-generator 200 can be determined using the IMU 195. In addition, as will be appreciated, the turbo-generator 200 can include other sensors as well, such as speed sensors, temperature sensors, pressure sensors, fluid flow sensors, torque sensors, current and/or voltage sensors, and the like. Sensor data can be provided to the controller 196.

As will be appreciated, the gas turbine engine 210 depicted in FIG. 3 is provided by way of example and is not intended to be limiting. In other example embodiments, the gas turbine engine can have other suitable configurations. For instance, in some embodiments, the gas turbine engine of the turbo-generator 200 can have multiple spools, such as a high pressure and a low pressure spool. In yet other embodiments, the driver or torque source driving the electric generator 230 may be a reciprocating engine or other rotary prime mover with a spinning shaft to which the electric generator 230 may be coupled.

As further depicted in FIG. 3, the electric generator 230 includes a rotor 232 and a stator 234. The stator 234 is stationary and can be coupled or connected to any suitable structure. The rotor 232 operatively couples the electric generator 230 with the spool 228, or more particularly with the shaft 226 of the spool 228, and rotates within the stator 234 about the rotation axis RA. In this regard, the rotor 232 of the electric generator 230 is in mechanical communication with the shaft 226. For this embodiment, the electric generator 230 is mounted coaxially with the shaft 226. However, in other example embodiments, the electric generator 230 can be positioned offset from the shaft 226 and can be mechanically coupled thereto via a suitable gearbox of gear train.

The electric generator 230 is configured to convert mechanical power output by the gas turbine engine 210 to electrical power. That is, when the rotor 232 is driven by rotation of the shaft 226, the interaction between windings and/or magnetic fields of the rotor 232 and stator 234 cause generation of electrical power as will be appreciated by those of skill in the art. The generated electrical power can be provided to various electrical loads of the aircraft 100. Further, although a single electric generator 230 is depicted in FIGS. 2 and 3, it will be appreciated that the gas turbine engine 210 can be coupled with multiple electric generators in other example embodiments, e.g., directly or via a suitable gearbox.

In addition, the aircraft 100 includes one or more pivot mounts 250 (only one shown in FIG. 3). Notably, the pivot mount 250 is operable to adjust an orientation of the turbo-generator 200 when controlled to do so. The pivot mount 250 can rotate and/or translate the turbo-generator 200. For this embodiment, the pivot mount 250 is configured as an electric actuator. In other example, embodiments, however, the pivot mount 250 can be a mechanical, hydraulic, electrohydraulic, pneumatic, or some other suitable type of actuator.

As depicted in FIG. 3, the pivot mount 250 includes a mounting base 252 mounted to a structure 142 of the aircraft 100 (FIG. 1). The structure 142 can be any suitable structure of the aircraft 100. The pivot mount 250 also includes a housing 254 that is connected to the mounting base 252. An adjustable arm 256 or rod is telescopically received within the housing 254. The distal end of the arm 256 includes a claw 258 that grips the cowl 212 of the gas turbine engine 210. When the arm 256 is moved, the orientation of the turbo-generator 200 may be adjusted.

With reference generally to FIGS. 1, 2, and 3, an example manner in which the turbo-generator 200 can be used to stabilize the aircraft 100 will now be provided. As previously noted, the hybrid electric architecture of the aircraft 100 allows the speed, power produced, and rotation axis RA of the turbo-generator 200 to be divorced or decoupled from the thrust needs and thrust axis of the aircraft 100. In this regard, the turbo-generator 200 can be used to stabilize the aircraft 100.

In a first control scheme, the orientation of the turbo-generator 200 can be adjusted to provide gyroscopic stabilizing control of the aircraft 100. Particularly, one or more processors of the computing system 190 of the aircraft 100 can receive data indicating an orientation of the rotation axis RA of the turbo-generator 200. The data can also include an orientation of the prime stability axis PSA of the aircraft 100. The data indicating an orientation of the rotation axis RA of the turbo-generator 200 can be received from the IMU 240 of the turbo-generator 200, for example. The data indicating an orientation of the prime stability axis PSA of the aircraft 100 can be a calculated orientation based on sensor data provided by the IMU 195 of the aircraft and various parameters, such as the aircraft center of mass, the configuration of the aircraft, the current weight of the aircraft, the thrust orientation of the propulsors 160, 170, the demanded thrust, ambient conditions, etc. In this manner, the prime stability axis PSA of the aircraft 100 can be calculated and received by the one or more processors of the computing system 190.

The one or more processors of the computing system 190 can cause the pivot mount 250 to adjust the rotation axis RA of the turbo-generator 200 relative to the prime stability axis PSA of the aircraft 100 based at least in part on the orientation of the rotation axis RA of the turbo-generator 200 relative to the orientation of the prime stability axis PSA of the aircraft 100.

Figure 4:
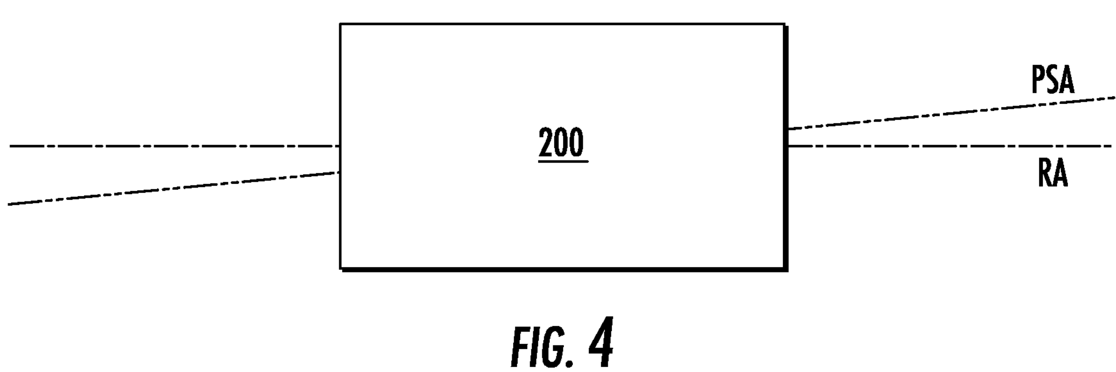
FIG. 4 provides a schematic view of a rotation axis of the turbo-generator of FIG. 3 relative to the prime stability axis of the aircraft of FIGS. 1 and 2 prior to implementation of a first stabilization control scheme.

By way of example, with reference now to FIGS. 1 through 5, FIGS. 4 and 5 provide schematic views of the rotation axis RA of the turbo-generator 200 relative to the prime stability axis PSA of the aircraft 100 (not depicted in FIG. 4; sec FIGS. 1 and 2) during a flight maneuver, e.g., during a thrust vector transition in which the first and second propulsors 160, 170 transition from a vertical thrust orientation to horizontal thrust orientation. As shown in FIG. 4, prior to implementing the first control scheme, the rotation axis RA of the turbo-generator 200 is not aligned with the prime stability axis PSA.

The orientations of the rotation axis RA and the prime stability axis PSA are received by the one or more processors of the computing system 190 as noted above, and to stabilize the aircraft 100, the one or more processors of the computing system 190 can cause the pivot mount 250 to adjust the rotation axis RA of the turbo-generator 200 relative to the prime stability axis PSA of the aircraft 100 based at least in part on the orientation of the rotation axis RA of the turbo-generator 200 relative to the orientation of the prime stability axis PSA of the aircraft 100.

Figure 7:
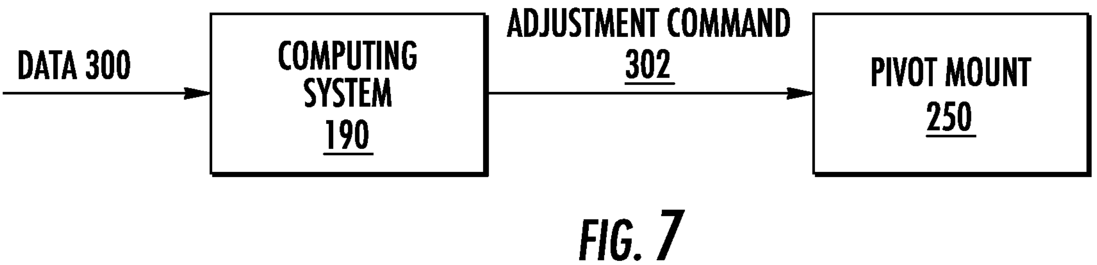
FIG. 7 provides an example flow diagram of a computing system of the aircraft of FIGS. 1 and 2 implementing the first stabilization control scheme.

As one example, with reference also to FIG. 7 that depicts an example flow diagram, the one or more processors of the computing system 190 can generate an adjustment command 302 based at least in part on the orientation of the rotation axis RA of the turbo-generator 200 relative to the orientation of the prime stability axis PSA of the aircraft 100 as determined from the data 300. The one or more processors of the computing system 190 can determine how to align the axes or move them closer into alignment using any suitable technique, such as a known technique used to align a pair of three-dimensional vectors. The adjustment command 302 can be a signal, that when received, causes the turbo-generator 200 to move. Specifically, the adjustment command can indicate a linear displacement that the arm 256 of the pivot mount 250 is to travel to adjust the rotation axis RA relative to the prime stability axis PSA. Based on the adjustment command 302, electrical power from the electric generator 230 and/or the electric energy storage units 152 can be provided to the pivot mount 250. In this manner, the pivot mount 250 can utilize the provided electrical power to displace the arm 256, which causes the claw 258 to adjust an orientation of the turbo-generator 200, and consequently, the orientation of the rotation axis RA of the turbo-generator 200.

Figure 5:
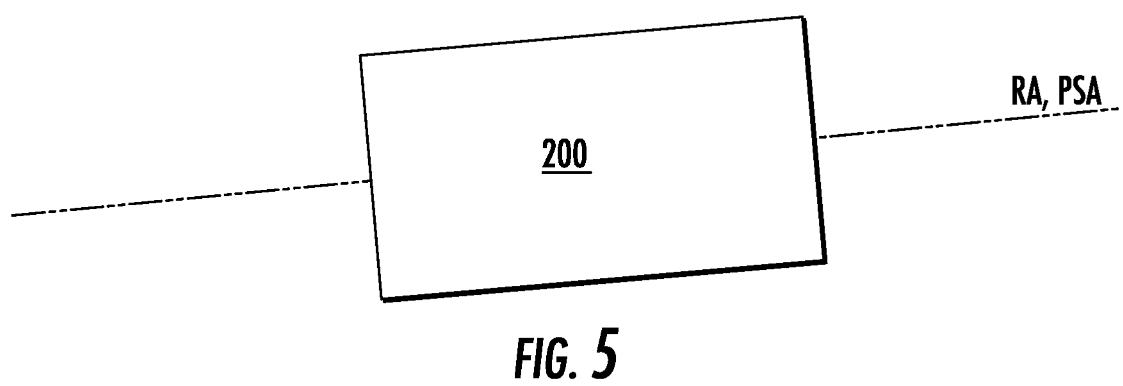
FIG. 5 provides a schematic view of the rotation axis of the turbo-generator relative to the prime stability axis of the aircraft after implementation of the first stabilization control scheme wherein the rotation axis is aligned with the prime stability axis.

In some embodiments, in causing the pivot mount 250 to adjust the rotation axis RA of the turbo-generator 200 relative to the prime stability axis PSA of the aircraft 100, the one or more processors of the computing system 190 can cause the pivot mount 250 to move the turbo-generator 200 so that the rotation axis RA is moved into alignment or closer into alignment with the prime stability axis PSA. By aligning the rotation axis RA and the prime stability axis PSA, the turbo-generator 200 applies inertial forces on the fuselage 112 and inside the aircraft 100 thereby countering the destabilizing forces caused by the torque of precession. This, in effect, stabilizes the aircraft 100. For instance, as shown in FIG. 5, the pivot mount 250 (FIG. 3) has moved the turbo-generator 200 so that the rotation axis RA is aligned with the prime stability axis PSA. Particularly, the pivot mount 250 (FIG. 3) has moved the turbo-generator 200 so that the rotation axis RA is aligned coaxially with the prime stability axis PSA.

In some instances, it may not be practical to exactly align the center of the rotation axis RA with the center of the prime stability axis PSA. In such instances, the one or more processors of the computing system 190 can cause the pivot mount 250 to move the turbo-generator 200 so that the rotation axis RA is moved closer into alignment with the prime stability axis PSA. This may still allow the turbo-generator 200 to provide stabilizing control of the aircraft 100. Although the rotation axis RA and the prime stability axis PSA are shown in two dimensions in FIGS. 4 and 5, in some embodiments, the pivot mount 250 may be configured to align the rotation axis RA and the prime stability axis PSA in three-dimensional space.

Figure 6:
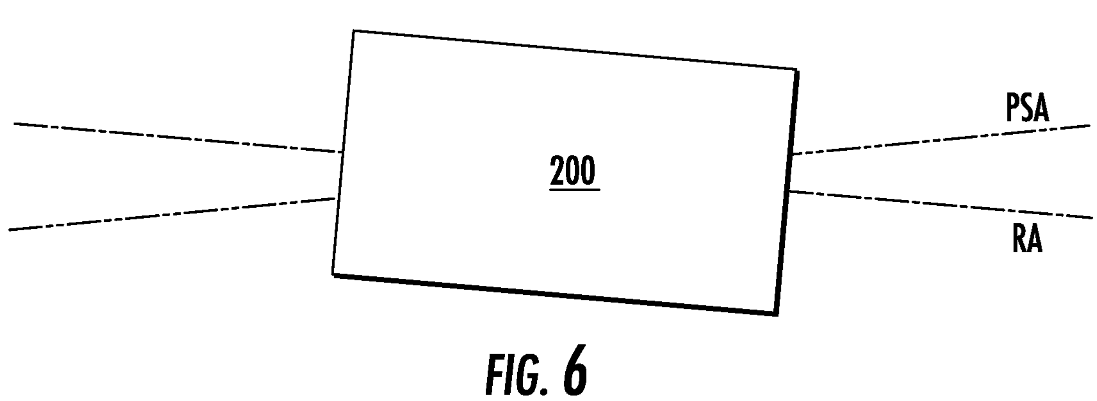
FIG. 6 provides a schematic view of the rotation axis of the turbo-generator relative to the prime stability axis of the aircraft after implementation of the first stabilization control scheme wherein the rotation axis is moved further from alignment relative to the prime stability axis.

In other embodiments, in causing the pivot mount 250 to adjust the rotation axis RA of the turbo-generator 200 relative to the prime stability axis PSA of the aircraft 100, the one or more processors of the computing system 190 can cause the pivot mount 250 to move the turbo-generator 200 so that the rotation axis RA is moved further out of alignment with the prime stability axis PSA. Moving the rotation axis RA further from alignment from the prime stability axis PSA may be desirable during some flight maneuvers. As shown in FIG. 6, the pivot mount 250 (FIG. 3) has moved the turbo-generator 200 from its position in FIG. 4 to its position in FIG. 6 so that the rotation axis RA is further from alignment from the prime stability axis PSA.

In some embodiments, optionally, upon receiving the data indicating the orientation of the rotation axis RA of the turbo-generator 200 and the data indicating the orientation of the prime stability axis PSA of the aircraft 100, the one or more processors of the computing system 190 can determine a degree of misalignment between the rotation axis RA of the turbo-generator 200 and the prime stability axis PSA of the aircraft 100. The degree of misalignment can be quantified using any suitable parameter, such as by angle. The one or more processors of the computing system 190 can compare the determined degree of misalignment to an alignment threshold.

When the determined degree of misalignment exceeds the alignment threshold, the one or more processors of the computing system 190 can initiate the first control scheme, or stated differently, the one or more processors of the computing system 190 can cause adjustment of the rotation axis RA relative to the prime stability axis PSA. The alignment threshold can be set so that the first control scheme is initiated only when the aircraft 100 is performing an aggressive maneuver or a thrust orientation transition, for example. In contrast, when the determined degree of misalignment does not exceed the alignment threshold, the one or more processors of the computing system 190 can decline to initiate the first control scheme.

In a second control scheme, which can be used in addition to or alternatively to the first control scheme, the rotational speed of the turbo-generator 200 can be adjusted to provide gyroscopic stabilizing control of the aircraft 100. As noted, the hybrid electric architecture of the aircraft 100 allows the rotational speed of the turbo-generator 200 to be decoupled from the thrust needs of the aircraft 100. In this regard, the rotational speed of the turbo-generator 200 can be changed to stabilize the aircraft 100 regardless of the thrust needs of the aircraft 100.

Particularly, as similarly noted above, one or more processors of the computing system 190 of the aircraft 100 can receive data indicating an orientation of the rotation axis RA of the turbo-generator 200. The data can also include an orientation of the prime stability axis PSA of the aircraft 100. The one or more processors of the computing system 190 can cause adjustment of a rotational speed of the turbo-generator 200, or more particularly, a rotational speed of the gas turbine engine 210 based at least in part on the orientation of the rotation axis RA of the turbo-generator 200 relative to the orientation of the prime stability axis PSA of the aircraft 100.

Figure 8:
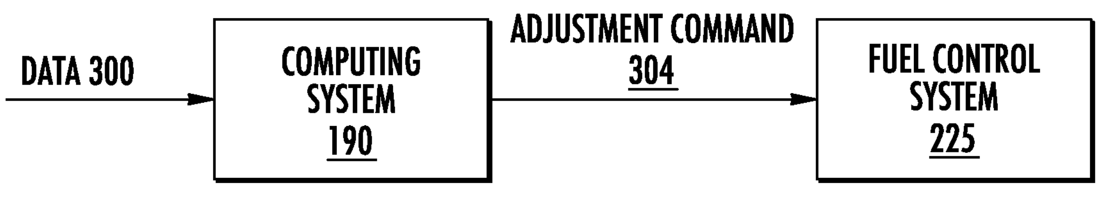
FIG. 8 provides an example flow diagram of a computing system of the aircraft of FIGS. 1 and 2 implementing a second stabilization control scheme.

As one example, with reference also to FIG. 8 that depicts an example flow diagram, the one or more processors of the computing system 190 can generate an adjustment command 304 based at least in part on the orientation of the rotation axis RA of the turbo-generator 200 relative to the orientation of the prime stability axis PSA of the aircraft 100 as determined from the data 300. The adjustment command 302 can be a signal, that when received, causes a rotational speed of the turbo-generator 200 to change. For instance, the adjustment command 304 can indicate instructions to the fuel system 225 of the gas turbine engine 210 (FIG. 3) to change to the amount of fuel provided to the combustor 218. In this regard, the one or more processors of the computing system 190 can control the fuel system 225 (e.g., one or more valves, fuel injectors, fuel distributors, etc. of the fuel system 225) of the gas turbine engine 210 to provide more or less fuel to the combustor 218, which ultimately changes the rotational speed of the spool 228.

By changing the rotational speed of the turbo-generator 200, the gyroscopic force that the turbo-generator 200 applies on the fuselage 112 can be changed. Consequently, the prime stability axis PSA of the aircraft 100 can be loosened or stiffened, thereby providing more or less stability to the aircraft 100. During such rotational speed changes, the electric energy storage units 152 can supplement or fully provide the electrical power needed by the electric motors 164, 174 to drive their respective fans 162, 172 (and in some instances the electric motor 184 to drive fan 182) and/or can receive and store excess electrical power generated by the electric generator 230 not currently needed by the loads of the aircraft 100.

In some embodiments, optionally, upon receiving the data indicating the orientation of the rotation axis RA of the turbo-generator 200 and the data indicating the orientation of the prime stability axis PSA of the aircraft 100, the one or more processors of the computing system 190 can determine a degree of misalignment between the rotation axis RA of the turbo-generator 200 and the prime stability axis PSA of the aircraft 100. The degree of misalignment can be quantified using any suitable parameter, such as by angle. The one or more processors of the computing system 190 can compare the determined degree of misalignment to an alignment threshold.

When the determined degree of misalignment exceeds the alignment threshold, the one or more processors of the computing system 190 can initiate the second control scheme, or stated differently, the one or more processors of the computing system 190 can cause adjustment of the rotational speed of the turbo-generator 200. For instance, the rotational speed of the spool 228 of the gas turbine engine 210 can be increased or decreased, e.g., by increasing or decreasing the fuel input into the combustor 218. The alignment threshold can be set so that the second control scheme is initiated only when the aircraft 100 is performing an aggressive maneuver or a thrust orientation transition, for example. In contrast, when the determined degree of misalignment does not exceed the alignment threshold, the one or more processors of the computing system 190 can decline to initiate the second control scheme.

In one example embodiment, the misalignment threshold associated with the first control scheme can be set at a lower threshold relative to the misalignment threshold associated with the second control scheme. In this way, when the determined degree of misalignment does not exceed either of the alignment thresholds, the one or more processors of the computing system 190 can decline to initiate the first and second control schemes. When the determined degree of misalignment exceeds the alignment threshold associated with the first control scheme but not the misalignment threshold associated with the second control scheme, the one or more processors of the computing system 190 can initiate the first control scheme but not the second control scheme. When the determined degree of misalignment exceeds the alignment threshold associated with the first control scheme and the alignment threshold associated with the second control scheme, the one or more processors of the computing system 190 can initiate both the first and second control schemes.

In another example embodiment, the misalignment threshold associated with the second control scheme can be set at a lower threshold relative to the misalignment threshold associated with the first control scheme. In this way, when the determined degree of misalignment does not exceed either of the alignment thresholds, the one or more processors of the computing system 190 can decline to initiate the first and second control schemes. When the determined degree of misalignment exceeds the alignment threshold associated with the second control scheme but not the misalignment threshold associated with the first control scheme, the one or more processors of the computing system 190 can initiate the second control scheme but not the first control scheme. When the determined degree of misalignment exceeds the alignment threshold associated with the second control scheme and the alignment threshold associated with the first control scheme, the one or more processors of the computing system 190 can initiate both the first and second control schemes.

In other example embodiments, the alignment threshold associated with the first control scheme and the alignment threshold associated with the second control scheme can be the same. In this regard, both control schemes can be initiated or not initiated depending on whether the misalignment threshold has been exceeded. In yet other embodiments, the computing system 190 and aircraft 100 may only be configured to implement one control scheme but not the other.

The one or more processors of the computing system 190 used to implement the first control scheme and/or the second control scheme can be embodied in any of the noted computing devices of the computing system 190. The one or more processors of a single computing device can be used to implement the first and/or second control scheme or one or more processors of multiple computing devices can be used to implement the control schemes. In some alternative embodiments, all or part of the adjustments based on sensor inputs and thresholds may be accomplished manually by the pilot or other aircrew member.

Figure 9:
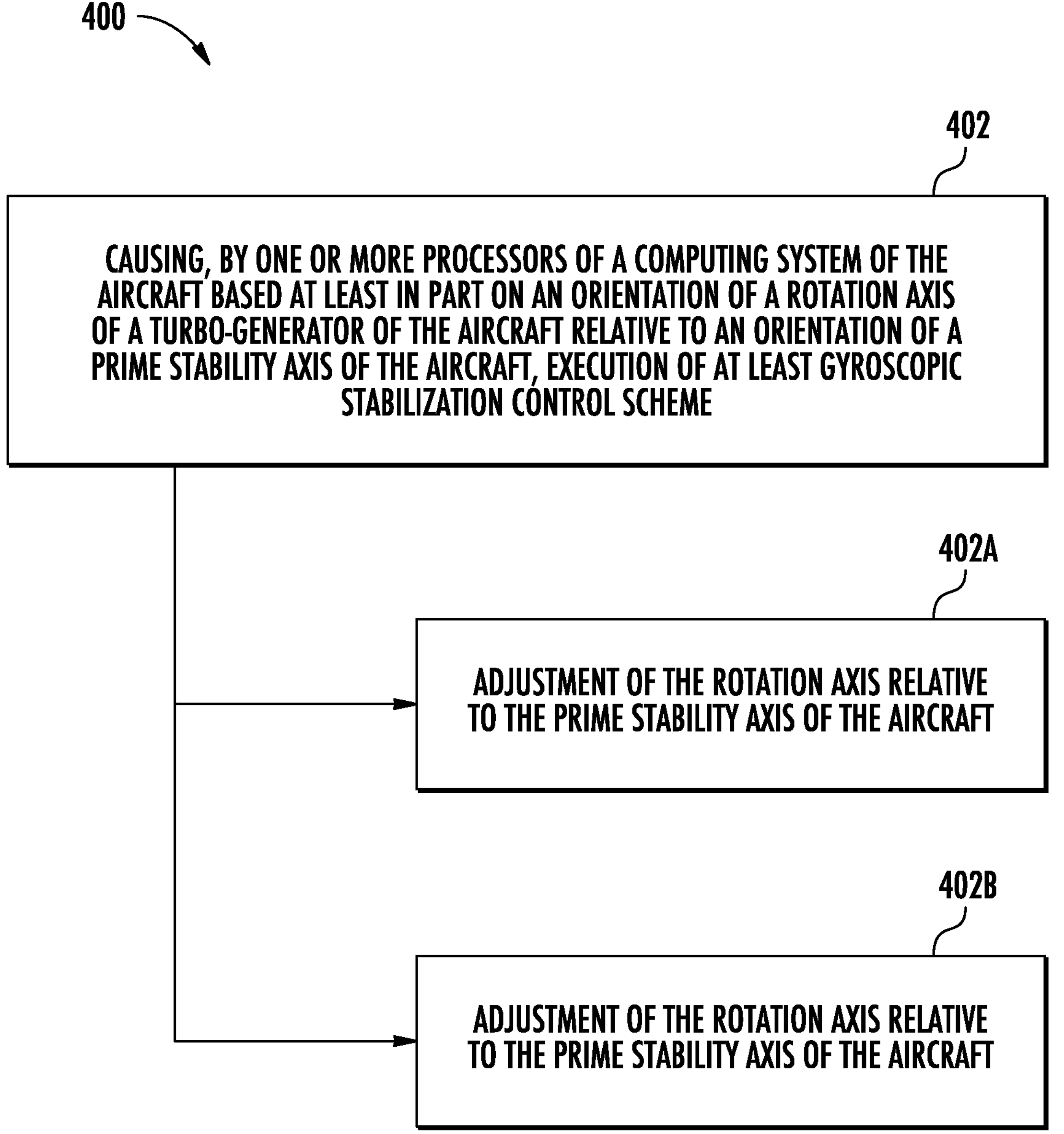
FIG. 9 provides a flow diagram of an exemplary method of operating a hybrid electric aircraft according to one example embodiment of the present disclosure.

FIG. 9 provides a flow diagram of a method (400) of gyroscopic stabilization of an aircraft according to one example embodiment of the present disclosure. For instance, method (400) can be used to provide gyroscopic stabilization control of the aircraft 100 of FIGS. 1 and 2. However, as will be appreciated, method (400) can be utilized to provide gyroscopic stabilization control of other hybrid electric aircraft having a turbo-generator and electrically-driven propulsors. In some implementations, the aircraft has one or more propulsors each movable to multiple thrust orientations, the one or more propulsors being electrically-driven propulsors. In this regard, the aircraft can be a hybrid electric VTOL aircraft. It will be appreciated that method (400) is discussed herein to describe exemplary aspects of the present subject matter and is not intended to be limiting. Reference may be made to FIGS. 1 through 8 below to provide context to method (400).

At (402), the method (400) includes causing, based at least in part on an orientation of a rotation axis of a turbo-generator of the aircraft relative to an orientation of a prime stability axis of the aircraft, execution of at least one gyroscopic stabilization control scheme to stabilize the aircraft, including at least one of: i) adjustment of the rotation axis relative to the prime stability axis of the aircraft; and ii) adjustment of a rotational speed of the turbo-generator. For instance, one or more processors of a computing system of the aircraft can receive data indicating the orientation of the rotation axis of the turbo-generator and the orientation of the prime stability axis of the aircraft. One or more IMUs 195, 240 can be used to generate or derive the data indicating the orientations of the rotation axis RA and the prime stability axis PSA. Then, based on the orientation of the rotation axis RA and the prime stability axis PSA, the one or more processors can execute the first control scheme, i.e., adjustment of the rotation axis relative to the prime stability axis of the aircraft, and/or the second control scheme, i.e., adjustment of a rotational speed of the turbo-generator.

At (402A), for instance, the method (400) can include executing the first control scheme. More particularly, the method (400) can include causing, based at least in part on an orientation of a rotation axis of a turbo-generator of the aircraft relative to an orientation of a prime stability axis of the aircraft, adjustment of the rotation axis relative to the prime stability axis of the aircraft. For instance, based on the orientation of the rotation axis RA and the prime stability axis PSA as provided or derived from the received data 300, the one or more processors of the computing system 190 can generate an adjustment command 302 representing instructions for the pivot mount 250 to move the turbo-generator 200 so that the rotation axis RA is moved or adjusted relative to the prime stability axis PSA.

In some implementations, as depicted by comparing the orientations of the rotation axis RA and the prime stability axis PSA in FIGS. 4 and 5, causing adjustment of the rotation axis RA relative to the prime stability axis PSA of the aircraft 100 includes adjusting the rotation axis RA of the turbo-generator 200 so that the rotation axis RA is moved into alignment or closer into alignment with the prime stability axis PSA of the aircraft 100. The pivot mount 250 can be caused to move the rotation axis RA of turbo-generator 200, as noted above. As shown in FIG. 4, the rotation axis RA of the turbo-generator 200 is misaligned with the prime stability axis PSA. Then, after the pivot mount 250 moves the turbo-generator 200 so that the rotation axis RA is moved relative to the prime stability axis PSA in accordance with the first control scheme, the rotation axis RA is shown in FIG. 5 aligned with or moved closer into alignment with the prime stability axis PSA.

In yet other implementations, causing adjustment of the rotation axis RA relative to the prime stability axis PSA of the aircraft 100 includes adjusting the rotation axis RA of the turbo-generator 200 so that the rotation axis RA of the turbo-generator 200 is moved further away from alignment with the prime stability axis PSA. As depicted in FIG. 4, the rotation axis RA of the turbo-generator 200 is misaligned with the prime stability axis PSA. Then, after the pivot mount 250 moves the turbo-generator 200 so that the rotation axis RA is moved relative to the prime stability axis PSA in accordance with the first control scheme, the rotation axis RA is shown in FIG. 6 moved further away from alignment with the prime stability axis PSA. The one or more processors can determine whether to move the rotation axis RA into or closer into alignment with the prime stability axis PSA or further away from alignment based at least in part on the phase of flight, the operating conditions, as well as other considerations.

At (402B), the method (400) can include executing the second control scheme. The second control scheme can be executed in addition to or alternatively to the first control scheme at (402A). More particularly, at (402B), the method (400) can include causing, based at least in part on an orientation of a rotation axis of a turbo-generator of the aircraft relative to an orientation of a prime stability axis of the aircraft, adjustment of a rotational speed of the turbo-generator. For instance, based on the orientation of the rotation axis RA and the prime stability axis PSA as provided or derived from the received data 300, the one or more processors of the computing system 190 can generate an adjustment command 304 representing instructions to the fuel system 225 for changing an amount of fuel provided to the combustor 218 of the gas turbine engine 210. In this regard, one or more processors of the computing system 190 can control the fuel system 225 (e.g., one or more valves, fuel injectors, fuel distributors, etc. thereof) of the gas turbine engine 210 to provide more or less fuel to the combustor 218, which ultimately changes the rotational speed of the spool 228. As previously noted, by changing the rotational speed of the turbo-generator 200, the gyroscopic force that the turbo-generator 200 applies on the fuselage 112 can be changed. Consequently, the prime stability axis PSA of the aircraft 100 can be loosened or stiffened, thereby providing more or less stability to the aircraft 100.

In some implementations, the computing system 190 of the aircraft 100 can constantly monitor the orientation of the rotation axis RA of the turbo-generator 200 relative to the prime stability axis PSA of the aircraft 100 during flight. Accordingly, one or both of the control schemes can be implemented at any time to stabilize the aircraft 100 during flight. In other implementations, the degree of misalignment may trigger execution of one or both of the control schemes.

For instance, in some implementations, the method (400) includes receiving, by one or more processors of a computing system of the aircraft, data indicating the orientation of the rotation axis of the turbo-generator and the orientation of the prime stability axis of the aircraft. The method (400) can further include determining, by the one or more processors, a degree of misalignment between the rotation axis and the prime stability axis using the data received. The degree of misalignment can be quantified using any suitable metric, such as an angle between the axes. In addition, the method (400) can include comparing, by the one or more processors, the degree of misalignment to an alignment threshold. The alignment threshold can be set so as to correspond to misalignment of the axes associated with aggressive flight maneuvers, such as banking turns, and/or during thrust vector transitions (i.e., transitioning of the propulsors 160, 170 from a vertical thrust orientation to a horizontal flight orientation or vice versa).

In such implementations, the method (400) can further include causing, by the one or more processors in response to whether the degree of misalignment exceeds the alignment threshold, at least one of: i) adjustment of the rotation axis relative to the prime stability axis of the aircraft; and ii) adjustment of the rotational speed of the turbo-generator. For instance, when the degree of misalignment exceeds the alignment threshold, the one or more processors can execute the first control scheme (i.e., adjustment of the rotation axis RA relative to the prime stability axis PSA of the aircraft 100) and/or the second control scheme (i.e., adjustment of the rotational speed of the turbo-generator 200, or more particularly, the spool 228 of the turbo-generator 200). In this manner, the control schemes need only be implemented to stabilize the aircraft in certain situations and minor misalignment need not trigger execution of one or both of the control schemes.

Figure 10:
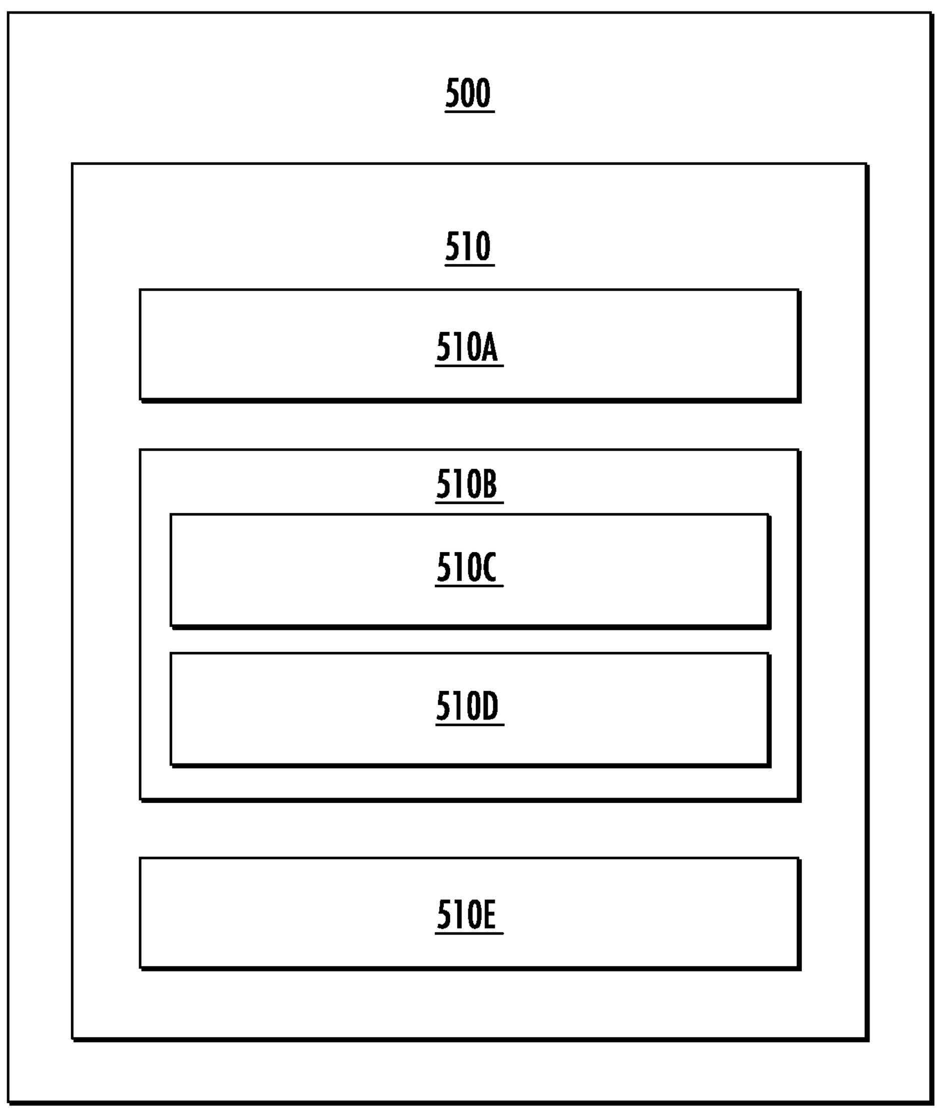
FIG. 10 provides an example computing system according to example embodiments of the present disclosure.

FIG. 10 provides an example computing system 500 according to example embodiments of the present disclosure. The computing system 190 described herein may include various components and perform various functions of the computing system 500 described below, for example.

As shown in FIG. 10, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-executable or computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, such as operations for causing a pivot mount to move the turbo-generator so that a rotation axis of the turbo-generator is adjusted relative to a prime stability axis of the aircraft, operations for causing an adjustment of a rotational speed of the turbo-generator, as well as other operations. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a communication network). The network interface 510E can include any suitable components for interfacing with one or more network(s), including for example, transmitters, receivers, ports, controllers, antennas, and/or other suitable components. One or more devices can be configured to receive one or more commands from the computing device(s) 510 or provide one or more commands to the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. An aircraft defining a prime stability axis, the aircraft comprising: a turbo-generator having a gas turbine engine and an electric generator operatively coupled with the gas turbine engine, the turbo-generator defining a rotation axis about which a spool of the gas turbine engine is rotatable; one or more propulsors, each of the one or more propulsors being electrically-driven; and a pivot mount operatively coupled with the turbo-generator, the pivot mount being operable to adjust the rotation axis of the turbo-generator relative to the prime stability axis of the aircraft.

2. The aircraft of any preceding clause, further comprising: a computing system having one or more processors, the one or more processors being configured to: receive data indicating an orientation of the rotation axis of the turbo-generator and an orientation of the prime stability axis of the aircraft; and cause the pivot mount to adjust the rotation axis of the turbo-generator relative to the prime stability axis of the aircraft based at least in part on the orientation of the rotation axis of the turbo-generator relative to the orientation of the prime stability axis of the aircraft.

3. The aircraft of any preceding clause, wherein in causing the pivot mount to adjust the rotation axis of the turbo-generator relative to the prime stability axis of the aircraft, the one or more processors cause the pivot mount to move the turbo-generator so that the rotation axis is moved into alignment or closer into alignment with the prime stability axis.

4. The aircraft of any preceding clause, wherein in causing the pivot mount to adjust the rotation axis of the turbo-generator relative to the prime stability axis of the aircraft, the one or more processors cause the pivot mount to move the turbo-generator so that the rotation axis is moved further out of alignment with the prime stability axis.

5. The aircraft of any preceding clause, further comprising: a computing system having one or more processors, the one or more processors being configured to: receive data indicating an orientation of the rotation axis of the turbo-generator and an orientation of the prime stability axis of the aircraft; and cause adjustment of a rotational speed of the spool of the gas turbine engine.

6. The aircraft of any preceding clause, further comprising: a fuselage; a first wing extending outward from the fuselage; and a second wing extending outward from the fuselage in a direction opposite the first wing, and wherein the one or more propulsors include a first propulsor pivotably mounted to the first wing and a second propulsor pivotably mounted to the second wing, the first and second propulsors both being movable to a first thrust orientation and a second thrust orientation.

7. The aircraft of any preceding clause, further comprising: a fuselage, wherein the turbo-generator is mounted within the fuselage.

8. The aircraft of any preceding clause, wherein the rotation axis of the turbo-generator is independent of a thrust orientation of the one or more propulsors.

9. The aircraft of any preceding clause, further comprising: a computing system having one or more processors, the one or more processors being configured to: receive data indicating an orientation of the rotation axis of the turbo-generator and an orientation of the prime stability axis of the aircraft; determine a degree of misalignment between the rotation axis and the prime stability axis; compare the degree of misalignment to an alignment threshold; and cause, only when the degree of misalignment exceeds the alignment threshold, the pivot mount to adjust the rotation axis of the turbo-generator relative to the prime stability axis of the aircraft.

10. A method of gyroscopic stabilization of an aircraft, the method comprising: causing, based at least in part on an orientation of a rotation axis of a turbo-generator of the aircraft relative to an orientation of a prime stability axis of the aircraft, at least one of: i) adjustment of the rotation axis relative to the prime stability axis of the aircraft; and ii) adjustment of a rotational speed of the turbo-generator.

11. The method of any preceding clause, wherein causing adjustment of the rotation axis relative to the prime stability axis of the aircraft comprises adjusting the rotation axis of the turbo-generator so that the rotation axis is moved into alignment or closer into alignment with the prime stability axis of the aircraft.

12. The method of any preceding clause, wherein causing adjustment of the rotation axis relative to the prime stability axis of the aircraft comprises adjusting the rotation axis of the turbo-generator so that the rotation axis of the turbo-generator is moved further away from alignment with the prime stability axis.

13. The method of any preceding clause, wherein causing adjustment of the rotation axis relative to the prime stability axis of the aircraft comprises causing a pivot mount operatively coupled with the turbo-generator to move the turbo-generator so that the rotation axis of the turbo-generator is adjusted relative to the prime stability axis of the aircraft.

14. The method of any preceding clause, further comprising: receiving, by one or more processors of a computing system of the aircraft, data indicating the orientation of the rotation axis of the turbo-generator and the orientation of the prime stability axis of the aircraft; determining, by the one or more processors, a degree of misalignment between the rotation axis and the prime stability axis using the data received; comparing, by the one or more processors, the degree of misalignment to an alignment threshold; and causing, by the one or more processors in response to whether the degree of misalignment exceeds the alignment threshold, at least one of:

i) adjustment of the rotation axis relative to the prime stability axis of the aircraft; and ii) adjustment of the rotational speed of the turbo-generator.

15. The method of any preceding clause, wherein the aircraft has one or more propulsors each movable to multiple thrust orientations, the one or more propulsors being electrically-driven propulsors.

16. A non-transitory computer readable medium comprising computer-executable instructions, which, when executed by one or more processors of a computing system of an aircraft, cause the one or more processors to: cause, based at least in part on an orientation of a rotation axis of a turbo-generator of the aircraft relative to an orientation of a prime stability axis of the aircraft, at least one of: i) adjustment of the rotation axis relative to the prime stability axis of the aircraft; and ii) adjustment of a rotational speed of the turbo-generator.

17. The non-transitory computer readable medium of any preceding clause, wherein in causing adjustment of the rotation axis relative to the prime stability axis of the aircraft, the one or more processors cause adjustment of the rotation axis of the turbo-generator so that the rotation axis is moved into alignment or closer into alignment with the prime stability axis of the aircraft.

18. The non-transitory computer readable medium of any preceding clause, wherein in causing adjustment of the rotation axis relative to the prime stability axis of the aircraft, the one or more processors cause adjustment of the rotation axis of the turbo-generator so that the rotation axis of the turbo-generator is moved further away from alignment with the prime stability axis.

19. The non-transitory computer readable medium of any preceding clause, wherein in causing adjustment of the rotation axis relative to the prime stability axis of the aircraft, the one or more processors cause a pivot mount operatively coupled with the turbo-generator to move the turbo-generator so that the rotation axis of the turbo-generator is adjusted relative to the prime stability axis of the aircraft.

20. The non-transitory computer readable medium of any preceding clause, wherein in executing the computer-executable instructions, the one or more processors are caused to: receive data indicating an orientation of the rotation axis of the turbo-generator and an orientation of the prime stability axis of the aircraft; determine a degree of misalignment between the rotation axis and the prime stability axis; compare the degree of misalignment to an alignment threshold; and cause, only when the degree of misalignment exceeds the alignment threshold, at least one of: i) adjustment of the rotation axis relative to the prime stability axis of the aircraft; and ii) adjustment of the rotational speed of the turbo-generator.

What is claimed is:

1. A method of gyroscopic stabilization of an aircraft, the method comprising:

causing, based at least in part on an orientation of a rotation axis of a turbo-generator of the aircraft relative to an orientation of a prime stability axis of the aircraft, at least one of:

i) adjustment of the rotation axis relative to the prime stability axis of the aircraft; and ii) adjustment of a rotational speed of the turbo-generator.

2. The method of claim 1, wherein causing adjustment of the rotation axis relative to the prime stability axis of the aircraft comprises adjusting the rotation axis of the turbo-generator so that the rotation axis is moved into alignment or closer into alignment with the prime stability axis of the aircraft.

3. The method of claim 1, wherein causing adjustment of the rotation axis relative to the prime stability axis of the aircraft comprises adjusting the rotation axis of the turbo-generator so that the rotation axis of the turbo-generator is moved further away from alignment with the prime stability axis.

4. The method of claim 1, wherein causing adjustment of the rotation axis relative to the prime stability axis of the aircraft comprises causing a pivot mount operatively coupled with the turbo-generator to move the turbo-generator so that the rotation axis of the turbo-generator is adjusted relative to the prime stability axis of the aircraft.

5. The method of claim 1, further comprising:

receiving, by one or more processors of a computing system of the aircraft, data indicating the orientation of the rotation axis of the turbo-generator and the orientation of the prime stability axis of the aircraft;

determining, by the one or more processors, a degree of misalignment between the rotation axis and the prime stability axis using the data received;

comparing, by the one or more processors, the degree of misalignment to an alignment threshold; and causing, by the one or more processors in response to whether the degree of misalignment exceeds the alignment threshold, at least one of:

i) adjustment of the rotation axis relative to the prime stability axis of the aircraft; and ii) adjustment of the rotational speed of the turbo-generator.

6. The method of claim 1, wherein the aircraft has one or more propulsors each movable to multiple thrust orientations, the one or more propulsors being electrically-driven propulsors.

7. The method of claim 1, wherein the adjustment of the rotation axis relative to the prime stability axis of the aircraft includes:

causing a pivot mount operatively coupled with the turbo-generator to move the turbo-generator, wherein the pivot mount is configured as an actuator.

8. The method of claim 7, wherein the causing the pivot mount operatively coupled with the turbo-generator to move the turbo-generator including linearly displacing an adjustable arm of the pivot mount.

9. The method of claim 1, wherein the adjustment of the rotational speed of the turbo-generator includes controlling delivery of fuel to a combustor of the turbo-generator.

10. The method of claim 1, further comprising:

receiving, by one or more processors of a computing system of the aircraft, data indicating the orientation of the rotation axis of the turbo-generator and the orientation of the prime stability axis of the aircraft;

determining, by the one or more processors, a degree of misalignment between the rotation axis and the prime stability axis using the data received;

comparing, by the one or more processors, the degree of misalignment to an alignment threshold; and wherein the alignment threshold includes a first alignment threshold associated with a first control scheme that controls adjustment of the rotation axis relative to the prime stability axis of the aircraft, and wherein the alignment threshold includes a second alignment threshold associated with a second control scheme that controls adjustment of the rotational speed of the turbo-generator;

wherein the causing, by the one or more processors in response to whether the degree of misalignment exceeds the alignment threshold, further comprises:

i) initiating the second control scheme when the degree of misalignment exceeds the second alignment threshold; and ii) initiating the second control scheme and the first control scheme when the degree of misalignment exceeds the second alignment threshold and the first alignment threshold.

11. A non-transitory computer readable medium comprising computer-executable instructions, which, when executed by one or more processors of a computing system of an aircraft, cause the one or more processors to:

cause, based at least in part on an orientation of a rotation axis of a turbo-generator of the aircraft relative to an orientation of a prime stability axis of the aircraft, at least one of:

i) adjustment of the rotation axis relative to the prime stability axis of the aircraft; and ii) adjustment of a rotational speed of the turbo-generator.

12. The non-transitory computer readable medium of claim 11, wherein in causing adjustment of the rotation axis relative to the prime stability axis of the aircraft, the one or more processors cause adjustment of the rotation axis of the turbo-generator so that the rotation axis is moved into alignment or closer into alignment with the prime stability axis of the aircraft.

13. The non-transitory computer readable medium of claim 11, wherein in causing adjustment of the rotation axis relative to the prime stability axis of the aircraft, the one or more processors cause adjustment of the rotation axis of the turbo-generator so that the rotation axis of the turbo-generator is moved further away from alignment with the prime stability axis.

14. The non-transitory computer readable medium of claim 11, wherein in causing adjustment of the rotation axis relative to the prime stability axis of the aircraft, the one or more processors cause a pivot mount operatively coupled with the turbo-generator to move the turbo-generator so that the rotation axis of the turbo-generator is adjusted relative to the prime stability axis of the aircraft.

15. The non-transitory computer readable medium of claim 11, wherein in executing the computer-executable instructions, the one or more processors are caused to:

receive data indicating an orientation of the rotation axis of the turbo-generator and an orientation of the prime stability axis of the aircraft;

determine a degree of misalignment between the rotation axis and the prime stability axis;

compare the degree of misalignment to an alignment threshold; and cause, only when the degree of misalignment exceeds the alignment threshold, at least one of:

i) adjustment of the rotation axis relative to the prime stability axis of the aircraft; and ii) adjustment of the rotational speed of the turbo-generator.

16. The non-transitory computer readable medium of claim 11, wherein in executing the computer-executable instructions, the one or more processors are caused to:

receive data indicating a state of the aircraft; and based on the data indicating a state of the aircraft, calculate the prime stability axis.

17. The non-transitory computer readable medium of claim 11, wherein the adjustment of the rotation axis relative to the prime stability axis of the aircraft includes:

causing a pivot mount operatively coupled with the turbo-generator to move the turbo-generator, wherein the pivot mount is configured as an actuator.

18. The non-transitory computer readable medium of claim 17, wherein the causing the pivot mount operatively coupled with the turbo-generator to move the turbo-generator including linearly displacing an adjustable arm of the pivot mount.

19. The non-transitory computer readable medium of claim 11, wherein in executing the computer-executable instructions, the one or more processors are further caused to:

receive, by one or more processors of a computing system of the aircraft, data indicating the orientation of the rotation axis of the turbo-generator and the orientation of the prime stability axis of the aircraft;

determine, by the one or more processors, a degree of misalignment between the rotation axis and the prime stability axis using the data received;

compare, by the one or more processors, the degree of misalignment to an alignment threshold; and wherein the alignment threshold includes a first alignment threshold associated with a first control scheme that controls adjustment of the rotation axis relative to the prime stability axis of the aircraft, and wherein the alignment threshold includes a second alignment threshold associated with a second control scheme that controls adjustment of the rotational speed of the turbo-generator;

wherein in executing the computer-executable instructions, the one or more processors are further caused to:

i) initiate the second control scheme when the degree of misalignment exceeds the second alignment threshold; and ii) initiate the second control scheme and the first control scheme when the degree of misalignment exceeds the second alignment threshold and the first alignment threshold.

20. A method of gyroscopic stabilization of an aircraft, the method comprising:

determining a degree of misalignment between a rotation axis of a turbo-generator of the aircraft and a prime stability axis of the aircraft;

compare the degree of misalignment to an alignment threshold, wherein the alignment threshold includes a first alignment threshold associated with a first control scheme that controls adjustment of the rotation axis relative to the prime stability axis of the aircraft, and wherein the alignment threshold includes a second alignment threshold associated with a second control scheme that controls adjustment of the rotational speed of the turbo-generator;

causing, based at least in part on between the degree of misalignment to the alignment threshold, one of:

i) initiating the second control scheme when the degree of misalignment exceeds the second alignment threshold; and ii) initiating the second control scheme and the first control scheme when the degree of misalignment exceeds the second alignment threshold and the first alignment threshold.

* * * * *